United States Patent Office 3,539,605
Patented Nov. 10, 1970

3,539,605
ION EXCHANGE METHOD OF PREPARING QUATERNARY AMMONIUM COMPOUNDS
Alfred W. Oberhofer, Alsip, Ill., assignor to Nalco Chemical Company, Chicago, Ill., a corporation of Delaware
No Drawing. Continuation-in-part of application Ser. No. 482,264, Aug. 24, 1965. This application Jan. 30, 1968, Ser. No. 701,540
Int. Cl. C07f 5/06, 7/22, 11/00
U.S. Cl. 260—429         6 Claims

ABSTRACT OF THE DISCLOSURE

A method of preparing new quaternary ammonium compounds having the formula:

$$Q_{2x-y}MO_x$$

where Q is a quaternary ammonium radical structure as follows:

where R is a radical selected from the group consisting of alkyl, alkenyl, alkaryl, aryl, cycloaliphatic and heterocyclic and the foregoing radicals having substituents thereon with the proviso that the total number of carbon atoms in said quaternary ammonium radical is at least 12, and may be as many as 80, M is an atom of the group listed in the Periodic Table selected from the group consisting of I–B, III–A, IV–A, IV–B, VI–B and VIII, x is an integer of 1–4 and y is the valence of said atom.

These compounds are prepared by contacting an ammonium form cationic resin with appropriate quaternary ammonium hydroxides and an alkali metal compound of the formula:

$$A_{2x-y}MO_x$$

where M, x and y each have a significance as above stated, and A represents an alkali metal.

---

This application is a continuation-in-part of my copending application, Ser. No. 482,264, filed Aug. 24, 1965 for Ion Exchange Method, now abandoned.

The instant invention is concerned with a method of preparing quaternary ammonium compounds via ion exchange techniques. More specifically, the present invention relates to an ion exchange method of preparing quaternary ammonium compounds having metal or non-metal oxides in the anionic portion of the molecule.

No simple direct method exists with respect to preparing quaternary ammonium compounds containing oxidic anions, that is, quaternaries having metal or non-metal oxides as anions and particularly higher molecular weight quaternaries. Commercially available quaternary ammonium materials generally have as the anionic counter ion to the organic portion of the molecule a common anion such as hydroxyl, halide, acetate, nitrate, etc. Attempts to produce quaternaries containing oxidic anions usually result in complete failure, or at a minimum, extremely low uneconomical yields. For example, attempted preparation of such amino quaternaries by direct digestion of oxides and quaternary amine hydroxides usually leads to considerable decomposition of the organic reactant prior to any chemical transformation of the molecules.

It therefore becomes an object of the invention to provide an ion exchange technique for preparing organic amine quaternaries having oxidic anions via simple and direct procedures.

A more specific object of the invention is to prepare the just described quaternaries in good yields without degradation of reactants or desired product by utilization of certain specific ion exchange techniques.

Other objects will appear hereinafter.

In accordance with the invention a method of preparing quaternary ammonium compounds containing an oxidic anionic portion has been discovered. More specifically, quaternary ammonium compounds represented by the following structure may be simply and easily prepared:

$$Q_{2x-y}MO_x$$

where Q is a quaternary ammonium radical structure as follows:

where R is a radical selected from the group consisting of alkyl, alkenyl, alkaryl, aryl, cycloaliphatic and heterocyclic and the foregoing radicals having substituents thereon with the proviso that the total number of carbon atoms in said quaternary ammonium radicals is at least 12, and may be as high as 80, M is an atom of the group listed in the Periodic Table selected from the group consisting of I–B, III–A, IV–A, IV–B, VI–B and VIII, x is an integer of 1–4 and y is the valence of said atom.

Broadly speaking the above type of quaternaries may be prepared by contacting a cation exchange resin in the ammonia form with a mixture containing a quaternary hydroxide htving the following structure:

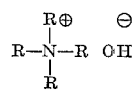

where R has a significance as above stated and a compound of the following structure:

$$A_{2x-y}MO_x$$

where M, x and y each have a significance as stated above and A represents an alkali metal and most preferably sodium. In this step the desired quaternary ammonium compounds contained in the anionic portion oxides of metals or non-metals are produced, and the ammonium form resin is put into an alkali metal form. The alkali metal form cation resin may be simply and easily transformed into a hydrogen form by contact with strong acids such as hydrochloric acid, sulfuric acid, etc. and subsequently put in ammonium form by means of ammonium hydroxide.

The mixture just described should contain at least one mole of quaternary hydroxide per mole of alkali metal compound. It is greatly preferred that an excess of quaternary hydroxide be employed since the amount un reacted aids as a basic stabilizer of the resultant product. From 5 to about 50% mole excess is most preferable in practice of the invention. The mixture is best contacted with resin in solution form with preferred solvent systems being water and polar organics such as ethanol, methanol, isopropanol, glycerine, etc. Solutions containing 5–60% by weight of the mixture are suitable.

The cation exchange resins used in the practice of the invention are well-known materials which need little elaboration. While preferred resins of this type are the strong acid cation exchange resins, it is understood that the weak acid cation resins may be likewise used though not with as great efficiency as the strong acid type. Most of the above materials are formed by starting with normally solid benzene-insoluble copolymers of a monovinyl aromatic compound and a polyvinyl aromatic compound containing from 12.0% to 60% by weight, preferably from 16.0% to 50% by weight of the polyvinyl aromatic compound, chemically combined with 40% to 88% by weight of the monovinyl aromatic compound. Examples of suitable monovinyl aromatic compounds are styrene, alpha methyl styrene, chlorostyrenes, vinyl toluene, vinyl naphthalene, and homologues thereof, capable of polymerizing as disclosed, for example, in U.S. Pat. 2,614,099. Examples of suitable polyvinyl aromatic compounds are divinyl benzene, divinyl toluene, divinyl xylene, divinyl naphthalene and divinyl ethyl benzene.

A typical strong acid cation exchange resin which may easily be put in ammonium form is prepared by sulfonating the above described copolymers to produce a resin having exchangeable hydrogen ions. A preferred sulfonated cation exchange resin is Nalcite HCR-W, which is a sulfonated styrene-divinyl benzene strongly acidic cationic exchanger of the type described in U.S. Pat. 2,366,007.

Another suitable type of hydrogen form strong acid cation exchanger resin, which may be subsequently transformed into ammonium form is a sulfonic acid phenolformaldehyde resin such as a resin derived by condensing a phenol sulfonic acid with formaldehyde. In general, resins having a plurality of sulfonic acid groups are the most suitable strong acid cation exchange resins for purposes of this invention.

The weak acid resins that are used in the present process comprise the present commercially available weakly acidic type resins containing carboxylic and/or phenolic groups as the functional sites. These acids are analogous to weakly basic resins in most respects. The weak acid resins are operable at a pH above 5.5 and do not split salts of strong acids. One available product is identified by the trademark Zerolit 216. According to an article by A. Hinsley, Proc. 23d An. Water Conf. Engr. Soc. of Western Pennsylvania, October 1962, Zerolit 216 is a condensation product containing both phenolic and carboxylic groups. Again contact of these resins with ammonium hydroxide easily yields the desired ammonium form resin.

The contact of resin and above-described mixture may be made by any conventional means. For example, a solution of the mixture may be passed through a column of resin. Likewise, the resin may be slurred in batch form with a solution of mixture of quaternary ammonium hydroxide and alkali metal compound. Ammonia released from the resin by alkali metal may be recovered and subsequently employed as a suitable regenerant to put the resin back in ammonium form.

Preferred alkali metal reactants having metals in the anionic portion of the molecule include iron, chromium, aluminum, gallium, copper, cobalt, nickel, silver, gold, zinc, cadmium, silicon, germanium, tin, lead, titanium, zirconium, thorium, molybdenum, tungsten, platinum, antimony, etc. Among these the most preferred metals are aluminum, chromium, iron, zinc, tungsten, tin, nickel, molybdenum, lead, titanium, and silicon. Thus, typical materials which may be treated with the ammonium form of the ion exchange resin to yield the corresponding quaternary ammonium compound include sodium aluminate, sodium tungstate, sodium stannate, sodium, silicate, sodium zincate, sodium titanate, sodium molybdate, sodium plumbate, etc. More preferred compounds which may be contacted with the ammonium form of the cation exchange resin and thus transformed are metals whose oxides are amphoteric in nature. Another preferred class of materials treated are those which are capable of forming hydrous metal oxide sols.

The treated quaternary ammonium hydroxides may be chosen from a host of known materials. Typical organic radicals represented by R which may be attached to the nitrogen atom are listed below.

TABLE I
(1) Dodecyl
(2) Tetradecyl
(3) Hexadecyl
(4) Lauryl
(5) Myristyl
(6) Palmityl
(7) Stearyl
(8) Oleyl
(9) Mixed alkyl-alkenyl radicals derived from coconut oil, cottonseed oil, tallow, hydrogenated tallow, soya, etc.
(10) Octyl
(11) Octodecyl
(12) Hexyl
(13) Ethyl
(14) Caprylyl
(15) Methyl
(16) Propyl
(17) t-Butyl
(18) Benzyl
(19) Morpholino
(20) n-Butyl
(21) Isopropyl
(22) Phenyl
(23) N-methyl morpholino
(24) Pyrrolidyl
(25) Imidazolyl
(26) 5-benzimidazolyl
(27) 2-hydroxyethyl imidazolyl
(28) 2-methyl imidazolyl
(29) Pyrazolyl
(30) Pyridyl
(31) Piperidyl
(32) 1-(2 hydroxyethyl)-2-N-heptadecenyl-2-amidazolyl
(33) 2-heptadecyl-2-imidazolyl
(34) 2-cyanomethyl-2-imidazolyl
(35) 1-(2-hydroethyl)-2-N-alkyl-2-amidazolyl
    (alkyl radical=11–17 carbon atoms)
(36) Cyclohexyl It has been noted that the treated quaternary hydroxide should contain at least about 12 carbon atoms, since lower molecular weight materials when contacting the resin tend to enter into the resin beads and remain thusly occluded. This is due to relatively small ionic size of these materials. Thus, the resin ends up in an undesirable mixed alkali metal-amine form, with considerably lessening of overall process efficiency.

The following examples illustrate typical modes of carrying out the process of the invention. It is understood, of course, that these examples are merely illustrative and that the invention is not to be limited thereto.

EXAMPLE I

In this experiment alkyldimethylbenzyl-ammonium aluminate was prepared. The alkyl group consisted of a mixture of high molecular weight straight hydrocarbon chains ranging from $C_8$ to $C_{18}$ and predominantly $C_{12}$-$C_{14}$. In this experiment 22 grams of a 50% solution of alkyl dimethylbenzylammonium hydroxide (where the alkyl radical is mixed as just described) was added to 35.7 grams of a 48% solution of sodium aluminate and 387 grams of deionized water. This mixture was passed through a column of a strong acid cation exchange resin in ammonium form, and the desired product was obtained in the effluent. The particular ion exchange resin involved was derived by sulfonation of a copolymer comprising 24% by weight of divinyl benzene and 76% by weight of styrene.

EXAMPLE II

This example was run according to the technique outlined in Example I. Specifically 100 ml. of the above-described amine hydroxide was mixed with 100 grams of 46% sodium aluminate. Instead of a column technique the resin contact was effected by a batch process. Specifically, to the above solution 300 ml. of an ammonium form resin (16% divinyl benzene—84% styrene) was added with stirring. The stirring was continued for 20–25 minutes at 30–35° C. At the end of this time the solution was filtered to remove the resin. The sodium concentration in the filtrate was extremely small in the range of about 10–25 p.p.m. This indicated a nearly complete conversion.

EXAMPLE III

In this example, tricaprylylmonomethylammonium tungstate was prepared. Initially 6 grams of hydrated sodium tungstate was dissolved in 70 ml. of tricaprylylmonomethylammonium hydroxide. To this mixture was added with stirring 25 ml. of the resin of Example II. After 20 minutes the solution was filtered to remove the resin, and an excellent yield of the desired product was obtained. A nearly pure amine quaternary tungstate in solid form was obtained by removal of solvent.

EXAMPLE IV

This example illustrates preparation of stearyl trimethylammonium stannate. 5.3 grams of sodium stannate in hydrate form was dissolved in 30 milliliters of water and 82 milliliters of stearyl trimethylammonium stannate. After stirring 20 minutes with 25 ml. of the resin of Example II, the resin was filtered off, leaving a clear solution of the amine quaternary stannate.

The compositions of the invention are useful as industrial microbiocides. They are also useful in the preparation of silica alumina, cracking catalysts, as corrosion inhibitor surfactants.

To illustrate the effectiveness of the composition as industrial microbiocide, the following is presented by way of example.

EXAMPLE V

Test method.—Gas tube and growth inhibition

In this test the culture medium used consisted of 24 grams of dextrose, and 1 gram of "Basaminbact" added to one liter of Chicago tap water and sterilized by autoclaving under 15 pounds of pressure for 15 minutes. The final pH of the autoclaved medium was 6.8±0.1. An appropriate amount of 18 to 24 hour nutrient broth culture of *A. aerogenes* or spore suspension of *A. niger* was mixed with 200 ml. of the culture medium immediately before starting tests, to give an inoculated culture medium having one million organisms per ml. of medium. This inoculated culture medium was placed in each of a series of fermentation tubes with caps which contained the appropriate concentration of test chemical to give a final volume of test chemical and culture medium of 20 ml. in each tube. For this purpose the maximum volume of chemical introduced should be 0.5 ml. per tube to avoid chemical-solvent interference. Many solvent carriers of active materials are themselves somewhat effective, and efficient comparative testing requires that only small amounts of these solvents be introduced into the culture medium. The chemical and the inoculated medium were mixed gently. Two control tests were also run, one in which the chemical was omitted, and the second in the absence of inoculum. In mixing tubes were inverted in the *A. aerogenes* gas inhibition study so as to fill the gas detection vials. The *A. niger* fungal growth inhibition study tubes were shaken. Inhibition ranges for *A. aerogenes* were determined by noting the presence or absence of gas production in the gas vials after 48 hours incubation of tubes at 90° F. The *A. niger* test tubes were incubated for 5 days at 30° C. and inhibition levels were determined by noting presence or absence of growth in the tubes at the end of this period of time.

Using the above described chemical synthesis and test method of inhibition several typical compositions of the invention were prepared and their activity determined. Results are reported as parts of chemical treating agent necessary to effectively inhibit one million microorganisms. These results are set forth in Table I.

In addition to the 48 hour inhibition test for *Aerobacter aerogenes* and 5 day inhibition test of *Aspergillus niger* activities of certain microbiocides of the invention were also determined with regard to 1 and 24 hour killing ranges. As indicated in the above test method an appropriate amount of 18 to 24 hour nutrient broth culture of *A. aerogenes* or spore suspension of *A. niger* was mixed with 200 milliliters of culture medium so as to give an inoculated culture medium having one million organisms per milliliter of culture medium. This inoculated culture medium was then added to tubes containing appropriate amounts of test chemicals, the total final volume of test chemical and culture medium being 20 milliliters in each tube. The maximum amount of test chemical introduced was 0.5 milliliter per tube to avoid the chemical solvent interferences. The inoculated media and test chemical were then mixed gently i.e., tubes were shaken in the *A. niger* fungal inhibition study, and inverted in the *A. aerogenes* inhibition study to fill the gas detection vials. At the end of 1 and 24 hours contact with the test chemicals, portions of the liquid in the test were diluted 1000 fold to stop the chemical action. The diluted samples were then cultured into sterile culture tubes, incubated for 48–72 hours at 30° C. and examined for growth. Results of these tests are tabulated in Table II.

TABLE II

| | A. aerogenes | | A. niger | |
|---|---|---|---|---|
| | 1 hr., kill, p.p.m. | 48 hr., inhib. | 1 hr., kill | 5 day, inhib. |
| Tricaprylyl mono methyl ammonium aluminate | <100 | 25–50 | 100–200 | 2.5–5.0 |
| Tricaprylyl mono methyl ammonium triethanolamine aluminate | <100 | 10–25 | 100 | 2.5–5.0 |
| Dodecyl dimethyl benzyl ammonium aluminate | <100 | 25–50 | 100–200 | 10–25 |

The compositions of the invention may be utilized for a variety of purposes; for example, they may be employed as corrosion inhibitors, surfactants, dispersants, fuel oil stabilizers, etc.

The invention is hereby claimed as follows:

1. The method of preparing quaternary ammonium compounds of the following structure:

$$Q_{2x-y}MO_x$$

where Q is a quaternary ammonium radical of the formula:

where R is an unsubstituted radical selected from the group consisting of alkyl, alkenyl, alkaryl, aryl, and cycloaliphatic radicals with the proviso that the total number of carbon atoms in said quaternary ammonium radicals is from 12 to 80, MO is selected from the group consisting of aluminate, chromate, tungstate, stannate, molybdate, plumbate, and silicate, $x$ is an integer of 1–4 and $y$ is the valence of M; which comprises the step of contacting a cation exchange resin in the ammonium form with a mixture of a quaternary hydroxide containing said above quaternary ammonium radical and an alkali metal compound having the formula:

$$A_{2x-y}MO_x$$

where M, MO, $x$ and $y$ each have a significance as above stated, and A represents an alkali metal, said quaternary hydroxide being present in said mixture in at least a mole to mole relationship with said alkali metal compound.

2. The method of claim 1 wherein said resin is a strong acid cation exchange resin.

3. The method of claim 2 wherein said resin is a highly cross-linked resin derived from copolymerization of 50–88% by weight of a monovinyl aromatic monomer and from 12 to 50% by weight of a polyvinyl aromatic monomer.

4. The method of claim 1 wherein R in each instance represents an alkyl group of at least 3 carbon atoms.

5. The method of claim 1 wherein said mixing placed in contact with said cation exchange resin is in solution form, with said solvating liquid being selected from the group consisting of aqueous liquids and polar organic solvents.

6. The method of claim 1 wherein said quaternary hydroxide is present in a molar excess in relationship to said alkali metal compound.

References Cited
UNITED STATES PATENTS

| | | | |
|---|---|---|---|
| 3,254,102 | 5/1966 | Swanson | 260—429 |
| 3,294,827 | 12/1966 | Swanson | 260—429 |
| 3,346,604 | 10/1967 | Roberts et al. | 260—429 |
| 3,227,748 | 1/1966 | Bragdon et al. | 260—501 |
| 3,314,752 | 4/1967 | Kerr | 23—113 |

OTHER REFERENCES

Latimer et al.: Reference Book of Inorganic Chemistry (1940), Macmillan Company, New York, N.Y., pp. 131 and 355.

TOBIAS E. LEVOW, Primary Examiner

A. P. DEMERS, Assistant Examiner

U.S. Cl. X.R.

252—51, 351, 390, 431; 260—2.2, 429.1, 429.3, 429.5, 429.7, 429.9, 435, 438.1, 438.5, 446, 448, 448.2, 567.6, 999; 424—287

PO-1050
(5/69)

UNITED STATES PATENT OFFICE
CERTIFICATE OF CORRECTION

Patent No. 3,539,605            Dated November 10, 1970

Inventor(s) Alfred W. Oberhofer

It is certified that error appears in the above-identified patent and that said Letters Patent are hereby corrected as shown below:

Column 2, line 55, "ûn re-" should read -- unre- --.

Column 3, line 44, "slurred" should read -- slurried --.

Column 3, line 61, "sodium, silicate," should read -- sodium silicate, --; line 67, "materials treated" should read -- materials easily treated --.

SIGNED AND
SEALED
FEB 2 1971

(SEAL)
Attest:

Edward M. Fletcher, Jr.

Attesting Officer

WILLIAM E. SCHUYLER, JR
Commissioner of Patents